(12) United States Patent
Sukhija et al.

(10) Patent No.: US 11,693,840 B2
(45) Date of Patent: Jul. 4, 2023

(54) DATABASE STORING AUTHENTICATED SKILL-BASED ATTRIBUTES

(71) Applicant: International Business Machines Corporation, Armonk, NY (US)

(72) Inventors: Sandeep Sukhija, Noida (IN); Harish Bharti, Pune (IN); Rajesh Kumar Saxena, Mumbai (IN); Vishal Agrawal, Noida (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/033,338

(22) Filed: Jul. 12, 2018

(65) Prior Publication Data
US 2020/0019616 A1 Jan. 16, 2020

(51) Int. Cl.
*G06F 16/00* (2019.01)
*G06F 16/22* (2019.01)
*H04L 9/40* (2022.01)
*G06F 16/23* (2019.01)

(52) U.S. Cl.
CPC ...... *G06F 16/2255* (2019.01); *G06F 16/2365* (2019.01); *H04L 63/08* (2013.01)

(58) Field of Classification Search
CPC .. G06F 16/2255; G06F 16/2365; G06F 16/20; H04L 63/08; H04L 63/12; H04L 9/3239; H04L 2209/38; H04L 67/1097
See application file for complete search history.

(56) References Cited

U.S. PATENT DOCUMENTS

| | | | |
|---|---|---|---|
| 2017/0060873 A1* | 3/2017 | Rathod | G06Q 10/06 |
| 2017/0103472 A1 | 4/2017 | Shah | |
| 2018/0165758 A1* | 6/2018 | Saxena | G06Q 30/02 |
| 2018/0332063 A1* | 11/2018 | Ford | H04L 63/1416 |
| 2019/0068747 A1* | 2/2019 | Lervik | G06F 16/9535 |
| 2019/0238525 A1* | 8/2019 | Padmanabhan | H04L 63/0428 |
| 2019/0334912 A1* | 10/2019 | Sloane | G06F 21/604 |
| 2019/0370358 A1* | 12/2019 | Nation | G06F 16/1805 |
| 2020/0042726 A1* | 2/2020 | Lawrenson | G06Q 50/01 |

FOREIGN PATENT DOCUMENTS

WO 2017153495 A1 9/2017

OTHER PUBLICATIONS

Xin Wang et al., Human Resource Information Management Model based on Blockchain Technology, Source: Service-Oriented System Engineering (SOSE), 2017 IEEE Symposium on, Publisher: IEEE, Please refer to Introduction and Abstract.

* cited by examiner

*Primary Examiner* — Paul Kim

(57) ABSTRACT

An example operation may include one or more of receiving a request to store a skill-based attribute of a user at a database, temporarily storing the skill-based attribute and an identification of one or more storage nodes associated with the skill-based attribute in a temporary data structure of the database, determining whether a predetermined amount of the one or more storage nodes have authenticated the user as having the skill-based attribute, and, in response successful authentication of the skill-based attribute by the predetermined amount of storage nodes, transferring the authenticated skill-based attribute from the temporary data structure to a primary data structure of the database.

20 Claims, 11 Drawing Sheets

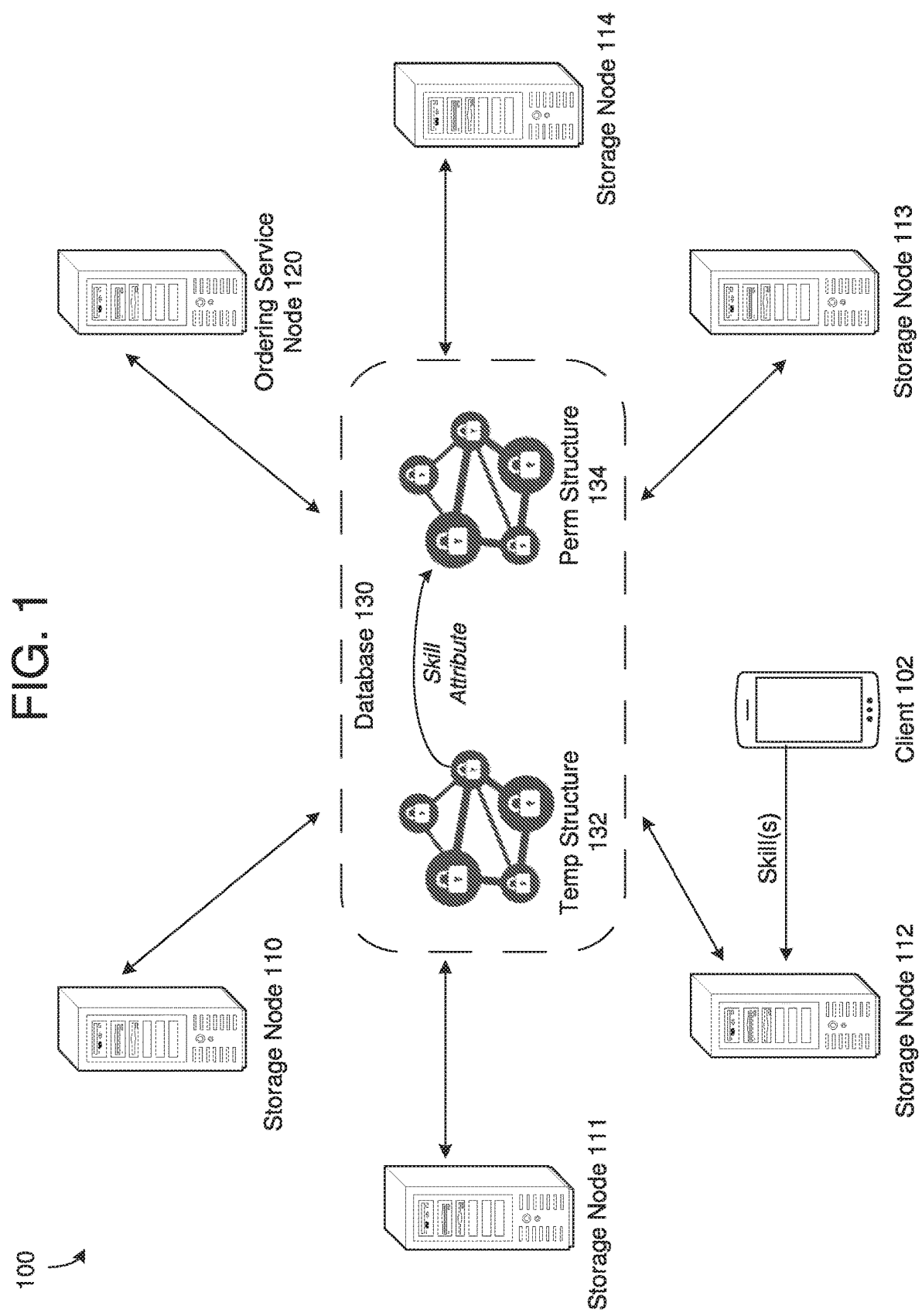

650

DATABASE STORING AUTHENTICATED SKILL-BASED ATTRIBUTES

TECHNICAL FIELD

This application generally relates to a database storage system, and more particularly, to a decentralized database system in which skill-based attributes achieved by a person can be validated, stored, and made available in a restricted manner.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. In particular, a centralized database has a single point of failure. For example, if fault-tolerance does not exist and a hardware failure occurs, all data within the database is lost and work of all users is interrupted. In addition, centralized databases are highly dependent on network connectivity. As a result, the slower the Internet connection, the longer the amount of time needed for each database access. Another drawback is that bottlenecks can occur when the centralized database experiences of high traffic due to the single location. Furthermore, a centralized database provides limited access to data because only one copy of the data is maintained by the database. As a result, multiple user stations cannot access the same piece of data at the same time without creating significant problems or risk overwriting stored data. Furthermore, because a central database system has minimal to no data redundancy, if a set of data is unexpectedly lost it is very difficult to retrieve it other than through manual operation from back-up disk storage.

When a person applies for employment, they are often asked for various attributes such as work history, certifications, schooling, and the like. However, these attributes are often unverified. In other words, the person could be embellishing attributes or even making-up the attributes. Therefore, what is needed is a storage and access mechanism for authentic work-related information.

SUMMARY

One example embodiment may provide a method that includes one or more of receiving a request to store a skill-based attribute of a user at a database, temporarily storing the skill-based attribute and an identification of one or more storage nodes associated with the skill-based attribute in a temporary data structure of the database, determining whether a predetermined amount of the one or more storage nodes have authenticated the user as having the skill-based attribute, and in response successful authentication of the skill-based attribute by the predetermined amount of storage nodes, transferring the authenticated skill-based attribute from the temporary data structure to a primary data structure of the database.

Another example embodiment may provide a computing system that includes one or more of a network interface configured to receive a request to store a skill-based attribute of a user at a database, and a processor configured to one or more of temporarily store the skill-based attribute and an identification of one or more storage nodes associated with the skill-based attribute in a temporary data structure of the database, determine whether a predetermined amount of the one or more storage nodes have authenticated that the user as has the skill-based attribute, and, in response successful authentication of the skill-based attribute by the predetermined amount of storage nodes, transfer the authenticated skill-based attribute from the temporary data structure to a primary data structure of the database.

A further example embodiment may provide a non-transitory computer readable medium comprising instructions, that when read by a processor, cause the processor to perform one or more of receiving a request to store a skill-based attribute of a user at a database, temporarily storing the skill-based attribute and an identification of one or more storage nodes associated with the skill-based attribute in a temporary data structure of the database, determining whether a predetermined amount of the one or more storage nodes have authenticated the user as having the skill-based attribute, and in response successful authentication of the skill-based attribute by the predetermined amount of storage nodes, transferring the authenticated skill-based attribute from the temporary data structure to a primary data structure of the database.

BRIEF DESCRIPTION OF THE DRAWINGS

FIG. 1 is a diagram illustrating a decentralized database system for storing skill-based attributes, according to example embodiments.

DETAILED DESCRIPTION

Figure 2A:
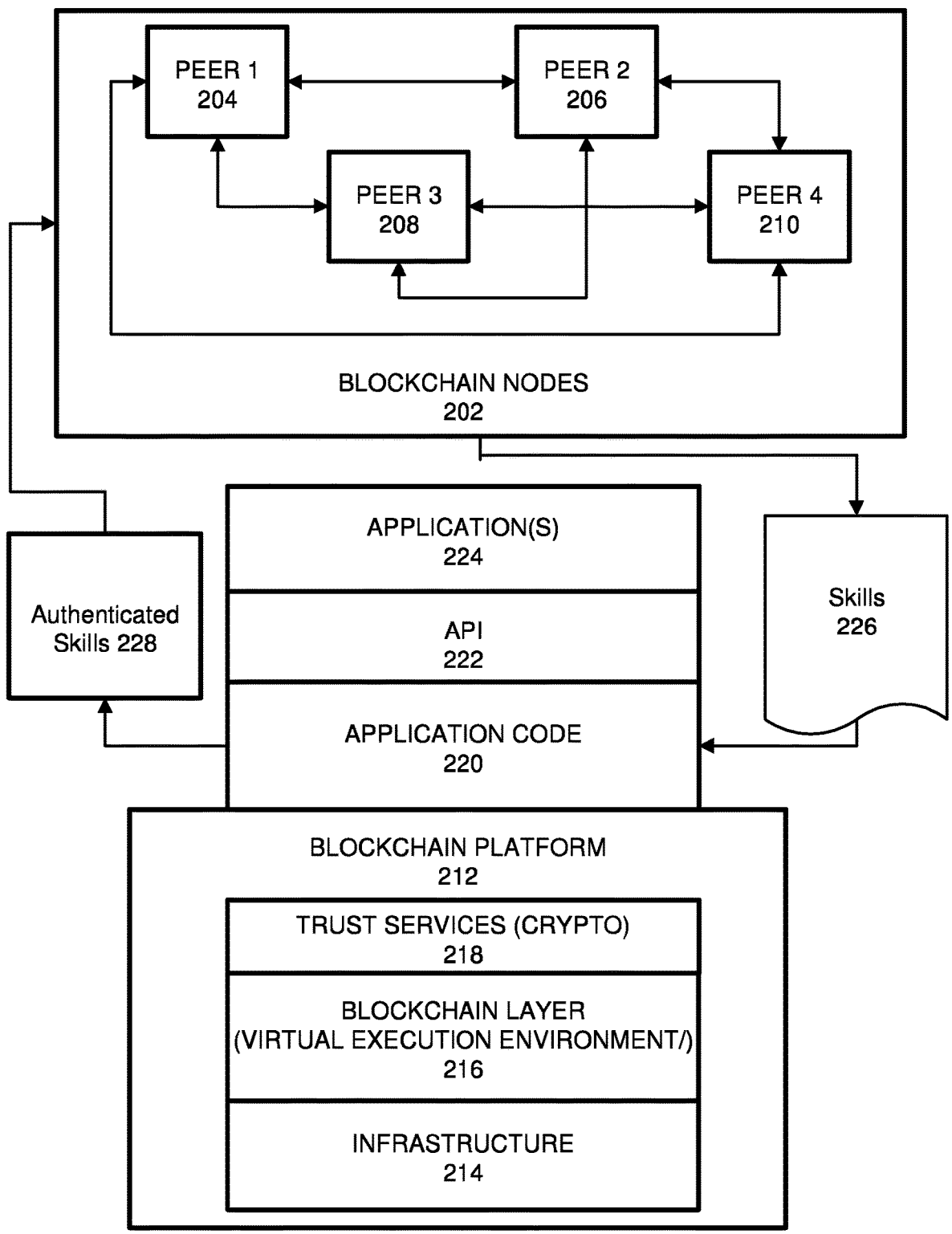
FIG. 2A is a diagram illustrating a peer node blockchain architecture configuration for an asset sharing scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a decentralized database for authenticating and storing skill-based attributes of a person.

A decentralized database is a distributed storage system which includes multiple storage nodes that communicate with each other. A blockchain is an example of a decentralized database which includes an append-only immutable data structure resembling a distributed ledger capable of maintaining records between mutually untrusted parties. The untrusted parties are referred to herein as nodes or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to a decentralized database that receives attributes of a person (worker) and stores them within a temporary data structure of the database. The decentralized database further receives authentication that the person possesses the skill-based attribute from trusted storage nodes of the decentralized database. In response, the database transfers the skill-based attribute from the temporary data structure to a primary data structure where it is accessible to search and retrieval by requesting entities such as potential employers that are authorized by the person.

Some of the benefits of such a decentralized system provide a trusted forum in which skills of a worker are stored and updated via an immutable ledger where interested parties can go and quickly receive authentic/verified information on the worker such as certifications, badges, skill sets, work history, education, and the like, without having to rely on data provided in a resume or a social networking page. No one party can update the primary data structure on their own. Rather, a consensus must be reached by storage nodes that have knowledge of the skill-based attribute. For example, in the case of a certification, the certification must be endorsed by an entity which performed the testing/validation of the certification. As another example, in the case of work history, the work history must be endorsed by an organization where the work history was performed. As another example, in the case of education, the education must be endorsed by an entity having first-hand knowledge of the schooling such as a school, a university, an organization, and the like.

A decentralized database such as blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the access to authentic skill-based attributes is implemented due to smart contracts, immutability, decentralization, security, consensus, integrity, transparency, and accessibility, which are inherent and unique to blockchain. In some embodiments, the blockchain storing skill-based attributes may be referred to as a "skill-chain."

In particular, the decentralized storage such as the blockchain is designed to be an append only structure. A user can only add more data, in the form of additional blocks. All previous data is permanently stored and cannot be altered. An update means a new block of data will be added thus all previous blocks remain unchanged. No delete operation is permitted. The system also implements smart contracts or chaincode which defines the role of different storage nodes or peers participating in forming the blockchain storage system. The roles can be validation of data, addition removal of nodes, means for alteration of data, how information in blockchain is by various nodes, and the like. Other rules that may be defined by the smart contracts include how to reach consensus, how the nodes/peers can be added/removed to the blockchain, and the like.

The blockchain also provides security in the form that only authorized nodes with their predefined roles can perform their corresponding operations in terms of validation, read, write, and approval of a new node. Data cannot be accessed by any entity not registered on the blockchain. The decentralized system may also include a shared ledger between various entities (storage nodes) which each maintain a replica of the blockchain thus sharing skill-based attributes authenticated by the validating nodes. The highest block will share the last information approved for a given candidate. Even if one node is not working or corrupted, other nodes will have all the information in shared ledger to be accessed by individual peers.

The system also provides consensus rules which may be defined in the smart contract and which identify information from which peer will be given preference in terms of authenticity in case of conflict. Anytime a similar information is updated by two different nodes, the validating nodes will reach the consensus on the final information in the new block based on rules defined in the smart contract.

The blockchain ensures integrity because every user can be sure that the data they are retrieving is uncorrupted and unaltered since the moment it was recorded. The blockchain ensures transparency because every user can verify how the blockchain has been appended over time from the start date to current date. The blockchain also provides accessibility to the skill-based attributes which are authenticated through a peer specific user interface along with the middleware which will be connecting to the blockchain. The smart contract may be deployed to the blockchain to ensure the rules are followed as defined in the smart contract. The data can be accessed on predefined mode by operations select, insert and update. New peers can be added while other peers can be rejected based on rules defined in smart contract.

The example embodiments provide numerous benefits over a traditional database. For example, through the blockchain the embodiments provide authenticated and endorsed skill-based attributes which must be agreed upon by untrusted entities before permanent storage. Meanwhile, if a traditional database were used to implement the example embodiments, the example embodiments would suffer from unnecessary drawbacks such as lack of immutability because a single entity (central authority) could make changes at will to the data, lack of consistency because updates on one database node may not be reflected at other database nodes, lack of consensus and therefore a single party could make changes (even fraudulent) without having to be verified by another entity, and the like. Accordingly, the example embodiments provide for a specific solution to a problem in the arts/field of secure database storage.

The example embodiments also change how data may be stored within a block structure of the blockchain. For example, skill-based attributes such as work history, education history, training, certifications, badges, and the like, may be stored within a data section of the data block. By storing skill-based attributes within data blocks of a blockchain, the skill-based attributes may be appended to an immutable ledger through a hash-linked chain of blocks. In some embodiments, the data block may store a timestamp of the creation of the data block in a header of the data block for keeping chronological order of the blocks, and smart contract information in a metadata section of the data block identifying roles of parties.

FIG. 1 illustrates a decentralized database system 100 for storing skill-based attributes, according to example embodiments. Referring to FIG. 1, the system 100 includes a plurality of storage nodes 110-114 and an ordering service node 120. The system 100 also includes a database 130 which includes a temporary data structure 132 and a primary (permanent) data structure 134. In some embodiments, the temporary data structure 132 and the permanent data structure 134 are blockchains, but embodiments are not limited thereto. The storage nodes 110-114 and the ordering service node 120 may be connected via a network such as a private network, the Internet, and/or the like. In this example, each of the storage nodes 110-114 may store a copy (replica) of the database 130. In order to update the contents of the permanent structure 134 of the database 130, the storage nodes 110-114 may need come to an agreement, referred to as a consensus. The ordering service node 120 may coordinate interaction between the storage nodes 110-114 with respect to making changes to the contents stored on the permanent structure 134 of the database 130.

A client 102 may submit a skill-based attribute of a person for storage within the database 130. In this example, the client 102 submits the initial request to the storage node 112. In response, the skill-based attribute may be stored in the temporary structure 132 of the database. In some cases, the skill-based attribute may be distributed to other storage nodes 110, 111, 113, and 114 for storage in their copy of the temporary data structure 132. The skill-based attribute may be associated with one or more storage nodes 110-114 who have knowledge of whether the user possesses the skill-based attribute. In some cases, a smart contract may identify which nodes need to endorse a skill-based attribute before it can be moved to the permanent data structure 134.

The receiving node 112 may initiate a consensus process with one or more other storage nodes within the system 100. In response to receiving the necessary endorsements, the receiving node 112 may submit the endorsed skill-based attribute to the ordering service node 120 which can trigger the transfer of the skill-based attribute from storage on the temporary data structure 132 to the permanent data structure 134. Here, the ordering service node 120 may transmit a message to each of the storage nodes 110-114 identifying that the skill-based attribute is authenticated. Accordingly, each of the storage nodes 110-114 may transfer the skill-based attribute from the temporary data structure 132 to the permanent data structure 134. Authenticated skill-based attributes stored in the permanent data structure 134 may be made accessible to authorized parties via a user interface. In contrast, if the skill-based attribute is not authenticated, it can be held indefinitely in the temporary data structure 132.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, skill-based attribute information 226 may be processed by one or more processing entities (e.g., virtual machines) included in the blockchain layer 216. The authentication result 228 may include skill-based attributes authenticated (endorsed) by one or more necessary parties. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, skill-based attributes 226 may be received and stored in a temporary data structure. One function may be to authenticate the skill-based attributes 228, which may be provided to one or more of the nodes 204-210 for inclusion in the permanent data structure.

Figure 2B:
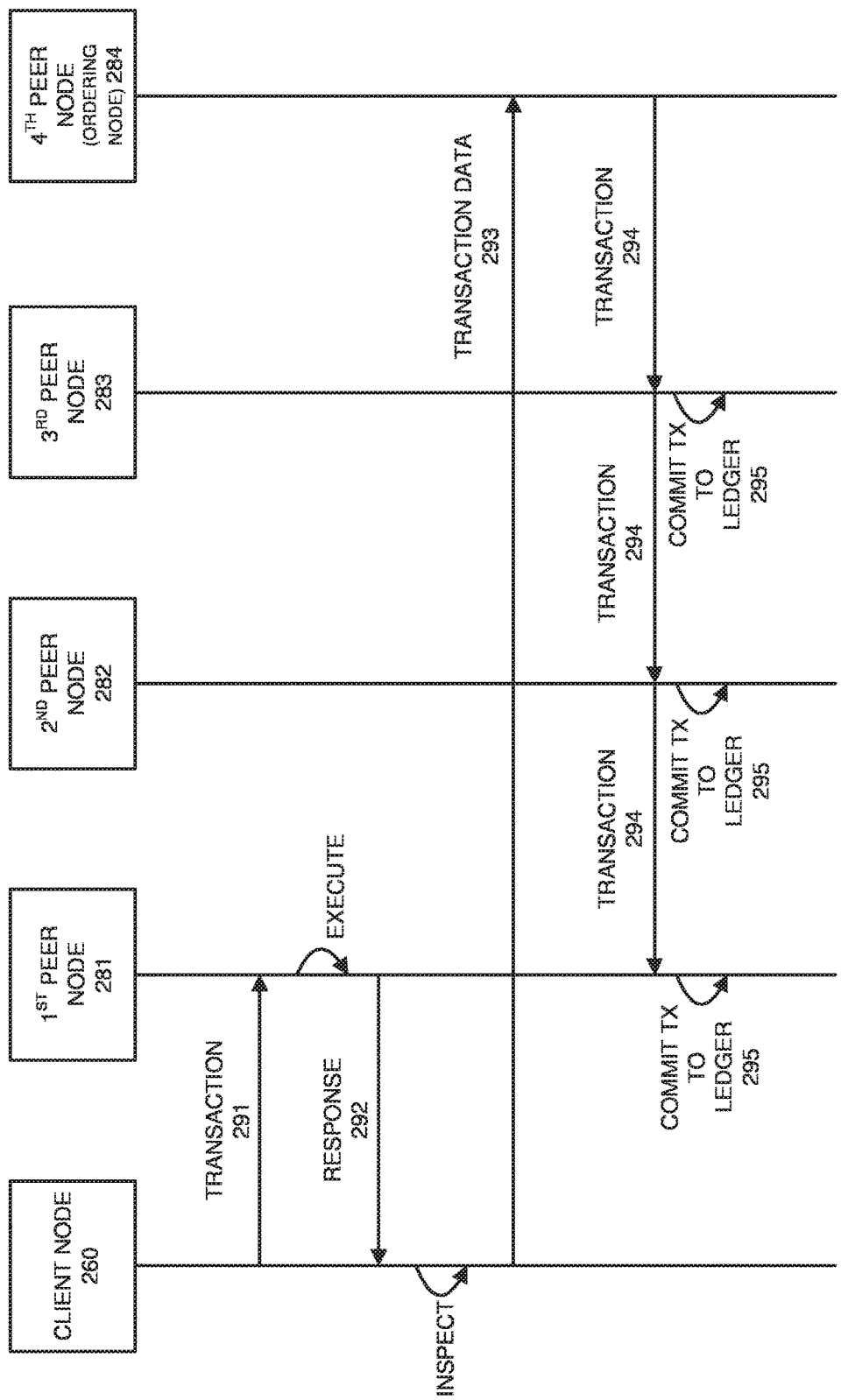
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
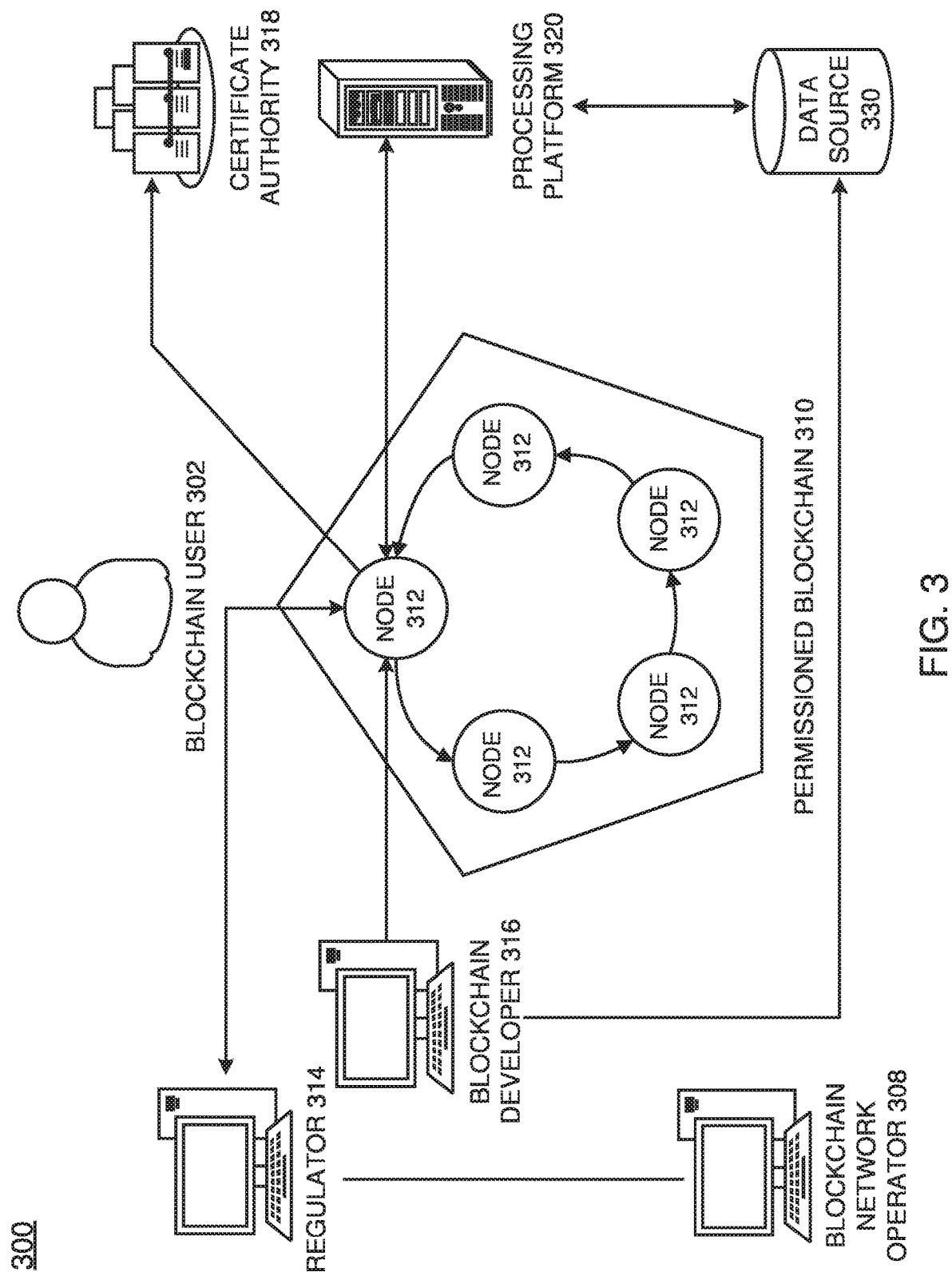
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
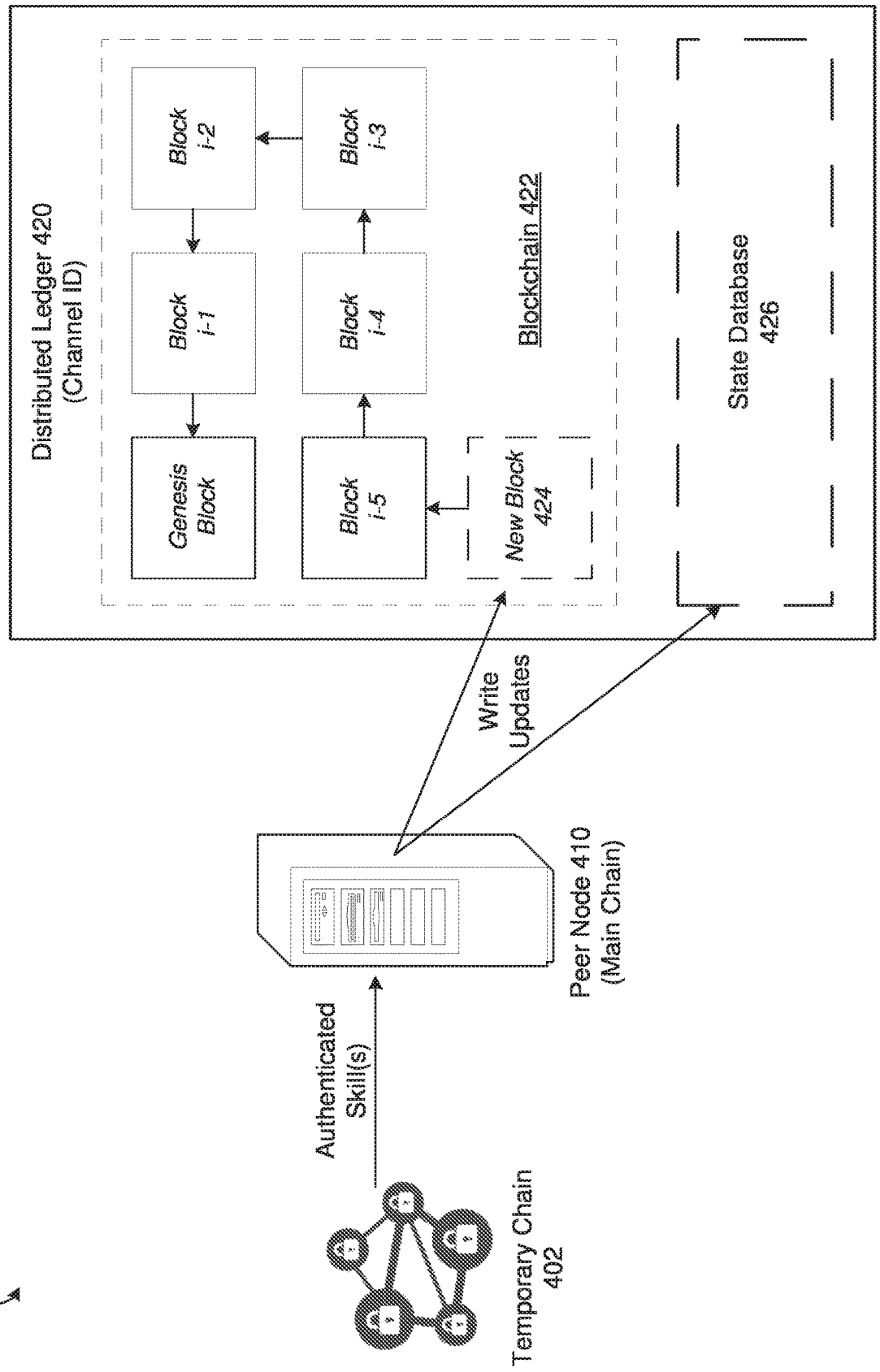
FIG. 4A is a diagram illustrating a process of an attribute transferred from a temporary data structure to a primary data structure, according to example embodiments.
Figure 4B:
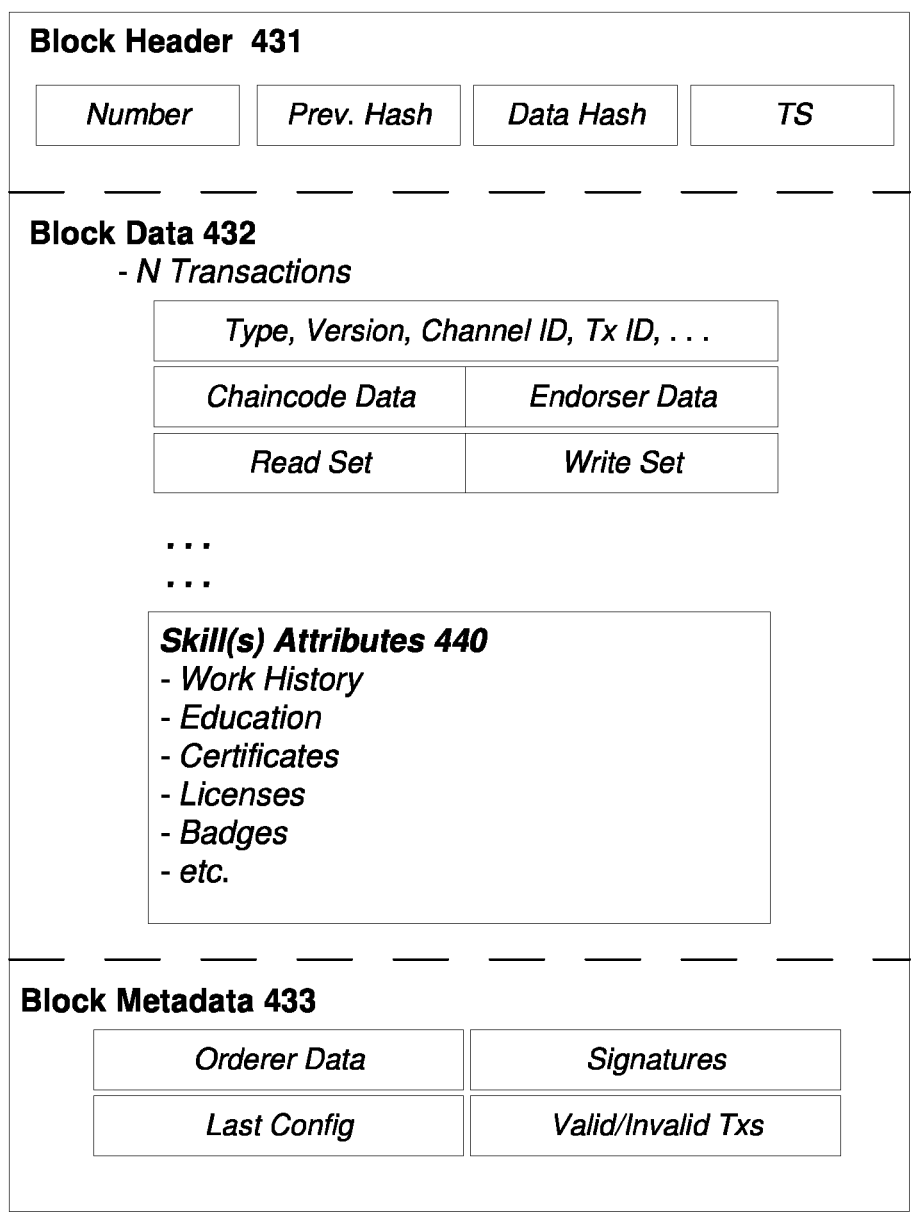
FIG. 4B is a diagram illustrating contents of a data block structure for a database, according to example embodiments.

FIG. 4A illustrates a process 400 of a new block being added to a distributed ledger 420, according to example embodiments, and FIG. 4B illustrates contents of a block structure 430 for blockchain, according to example embodiments. Referring to FIG. 4A, clients (not shown) may submit transactions for adding skill-based attributes to a decentralized database storage system such as a blockchain 422 stored on distributed ledger 420. Initially, before authentication, the skill-based attributes may be stored on a temporary blockchain 402. After successful authentication, a peer node 410 (storage node) may transfer the authenticated skill-based attributes to a permanent data structure which in this example is represented by blockchain 422 contained within the distributed ledger 420. Clients may be instructions received from any source to enact activity on the blockchain 422. As an example, clients may be applications that act on behalf of a requester, such as a device, person or entity to propose transactions for the blockchain.

The peer node 410 (as well as all or a plurality of peer nodes in the decentralized database system) may maintain a state of the blockchain network and a copy of the distributed ledger 420. Different types of blockchain nodes/peers may be present in the blockchain network including endorsing peers which simulate and endorse transactions proposed by clients and committing peers which verify endorsements, validate transactions, and commit transactions to the distributed ledger 420. According to various embodiments, an endorsing peer may verify the authenticity of a skill-based attribute of a user. For example, the endorsing peer may have first- and knowledge the skills possessed by the user because the endorsing peer is a previous organization that the user worked for, a government authority, a licensing organization, a certification organization, and the like. In this example, each blockchain nodes (such as peer node 410) may perform the role of endorser node, committer node, or both.

The distributed ledger 420 includes a blockchain 422 which stores immutable, sequenced records in blocks, and a state database 426 (current world state) maintaining a current state of the blockchain 422. One distributed ledger 420 may exist per channel and each peer maintains its own copy of the distributed ledger 420 for each channel of which they are a member. The blockchain 422 is a transaction log, structured as hash-linked blocks where each block contains a sequence of N transactions. In these examples, the transactions may include storage of updates or new skill-based attributes of a user. Also, traditional transaction data may be stored along with or instead of the skill-based attributes. In some cases, a block may contain both skill-based attributes and traditional blockchain transactions.

Blocks may include various components such as shown in FIG. 4B. The linking of the blocks (shown by arrows in FIG. 4A) may be generated by adding a hash of a prior block's header within a block header of a current block. In this way, all transactions on the blockchain 422 are sequenced and cryptographically linked together preventing tampering with blockchain data without breaking the hash links. Furthermore, because of the links, the latest block 424 in the blockchain 422 represents every transaction that has come before it. The blockchain 422 may be stored on a peer file system (local or attached storage), which supports an append-only blockchain workload.

The current state of the blockchain 422 and the distributed ledger 420 may be stored in the state database 426. Here, the current state data represents the latest values for all keys ever included in the chain transaction log of the blockchain 422, and may include the latest values for all skill-based attributes of a user. Chaincode invocations execute transactions against the current state in the state database 426. To make these chaincode interactions extremely efficient, the latest values of all keys are stored in the state database 426. The state database 426 may include an indexed view into the transaction log of the blockchain 422, it can therefore be regenerated from the chain at any time. The state database 426 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. In some cases, endorsing nodes have first-hand knowledge of the skills possessed by a user such as work history, certifications, training, licenses, badges, education, and the like. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service (e.g., ordering service node 120 in FIG. 1).

The ordering service accepts endorsed transactions, orders them into a block, and delivers the blocks to the committing peers. For example, the ordering service may initiate a new block 424 when a threshold of transactions has been reached, a timer times out, or another condition. In the example of FIG. 4A, the peer node 410 is a committing peer that has received a new data block 424 for storage on blockchain 422.

The ordering service may be made up of a cluster of orderers. The ordering service may not process transactions, smart contracts, or maintain the shared ledger. Rather, the ordering service may accept the endorsed transactions and specifies the order in which those transactions are committed to the distributed ledger 420. The architecture of the blockchain network may be designed such that the specific implementation of 'ordering' (e.g., Solo, Kafka, BFT, etc.) becomes a pluggable component.

Transactions are written to the distributed ledger 420 in a consistent order. The order of transactions is established to ensure that the updates to the state database 426 are valid when they are committed to the network. Unlike a cryptocurrency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service initializes a new block 424, the new block 424 may be broadcast to committing peers (e.g., peer node 410, etc.) In response, each committing peer validates the transaction within the new block 424 by checking to make sure that the read set and the write set still match the current world state in the state database 426. Specifically, the committing peer can determine whether the read data that existed when the endorsers simulated the transaction is identical to the current world state in the state database 426. When the committing peer validates the transaction, the transaction is written to the blockchain 422 on the distributed ledger 420, and the state database 426 is updated with the write data from the read-write set. If a transaction fails, that is, if the committing peer finds that the read-write set does not match the current world state in the state database 426, the transaction ordered into a block will still be included in that block, but it will be marked as invalid, and the state database 426 will not be updated.

Referring to FIG. 4B, a block 430 (also referred to as a data block) that is stored on the blockchain 422 of the distributed ledger 420 may include multiple data segments such as a block header 431, block data 432, and block metadata 433. It should be appreciated that the various depicted blocks and their contents, such as block 430 and its contents. shown in FIG. 4B are merely for purposes of example and are not meant to limit the scope of the example embodiments. In some cases, both the block header 431 and the block metadata 433 may be smaller than the block data 432 which stores transaction data, however this is not a requirement. The block 430 may store transactional information of N transactions (e.g., 100, 500, 1000, 2000, 3000, etc.) within the block data 432. The block 430 may also include a link to a previous block (e.g., on the blockchain 432 in FIG. 4A) within the block header 431. In particular, the block header 431 may include a hash of a previous block's header. The block header 431 may also include a unique block number, a hash of the block data 432 of the current block 430, a timestamp, and the like. The timestamp may be held in the header 431 to maintain the chronological order of a block with respect to other blocks on the chain. The block number of the block 430 may be unique and assigned in an incremental/sequential order starting from zero. The first block in the blockchain may be referred to as a genesis block which includes information about the blockchain, its members, the data stored therein, etc.

The block data 432 may store transactional information of each transaction that is recorded within the block 430. For example, the transaction data may include one or more of a type of the transaction, a version, a timestamp, a channel ID of the distributed ledger 420, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 432 may also store skill-based attribute data 440 of users which may be authenticated and which adds additional information to the hash-linked chain of blocks in the blockchain 422. Accordingly, the skill-based attribute information 440 can be stored in an immutable log of blocks on the distributed ledger 420. The skill-based attribute information 440 may include personal information (name, email, phone number, SSN, address, etc.), educational information (schooling, years, where attended, etc.), work history information (organization, years, etc.), licenses received (legal, professional, etc.), certifications, badges, training, and the like.

Some of the benefits of storing authentic skill-based attribute information 440 is that it provides a trusted, immutable copy of skills of a user that have been agreed upon (consensus) by at least one other unrelated party besides the user himself or herself In other words, the skill-based attribute information must be endorsed by a party associated with the skill (e.g., employer, licensing organization, certifying authority, training organization, etc.)

The block metadata 433 may store multiple fields of metadata (e.g., as a byte array, etc.). Metadata fields may include signature on block creation, an identification of what entity must endorse a skill, a reference to a last configuration block, a transaction filter identifying valid and invalid transactions within the block, last offset persisted of an ordering service that ordered the block, and the like. The signature, the last configuration block, and the orderer metadata may be added by the ordering service. Meanwhile, a committer of the block (such as blockchain node 422) may add validity/invalidity information based on an endorsement policy, verification of read/write sets, and the like. The transaction filter may include a byte array of a size equal to the number of transactions in the block data 432 and a validation code identifying whether a transaction was valid/invalid.

Figure 4C:
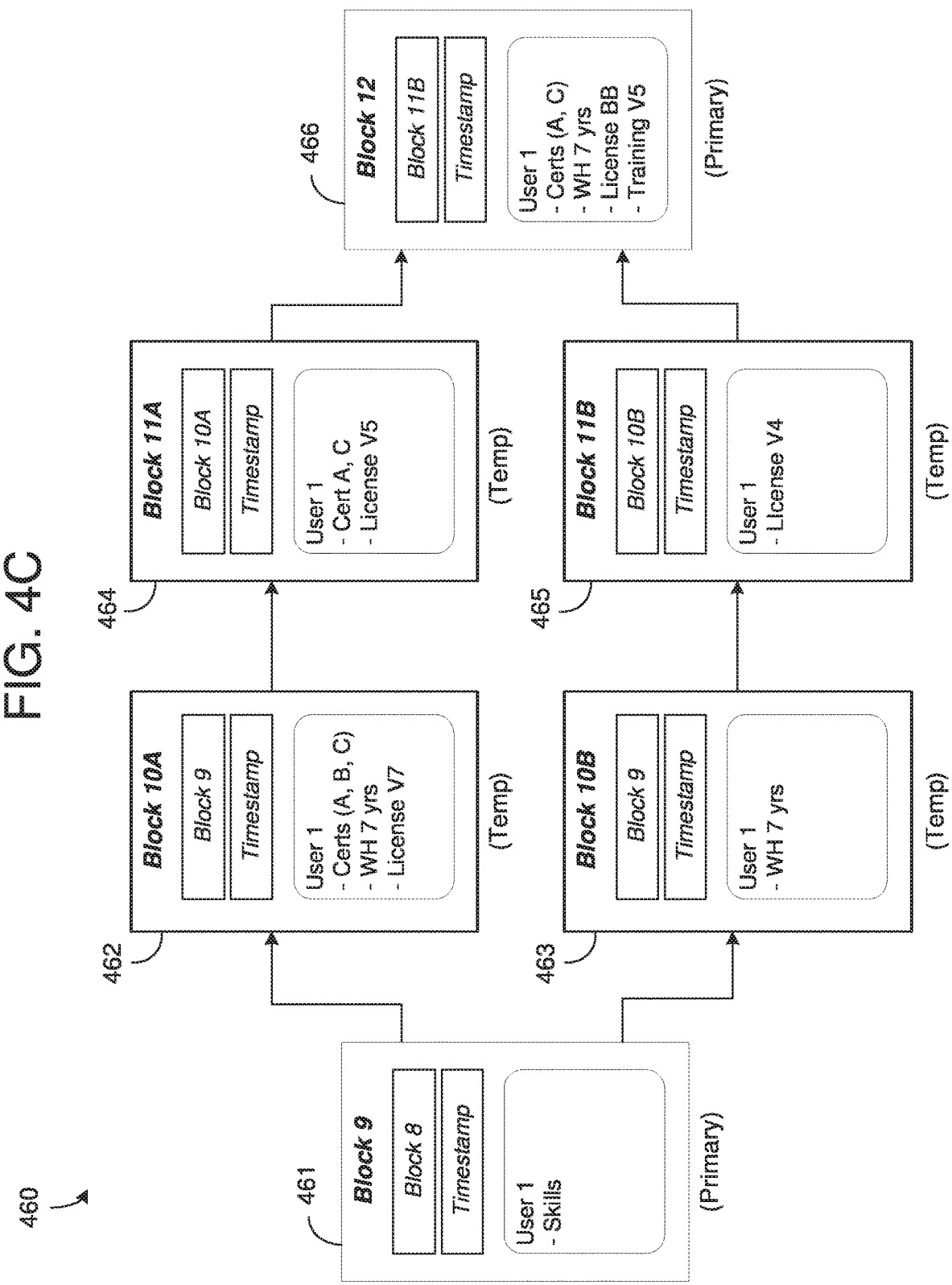
FIG. 4C is a diagram illustrating a process for resolving conflicting authentication content, according to example embodiments.

FIG. 4C illustrates a process 460 for resolving conflicting authentication content, according to example embodiments. In the example of FIG. 4C, six data blocks 461-466 associated with a user (user 1) are generated in response to transactions being submitted to the decentralized database system described herein. In this example, data blocks 461 (block 9) and block 466 (block 12) are committed to the permanent blockchain while blocks 462 (block 10A), 463 (block 10B), 464 (block 11A), and 465 (block 11B), are stored on the temporary blockchain. In particular, block 461 includes a most recently stored update to the user's skills or other profile information of the user (user 1) which has been authenticated and stored on the main blockchain.

Meanwhile, block 462 represents a transaction transmitted from the user 1 to update his/her profile to include a new set of skill-based attributes. Here, the submission of block 462 may trigger an endorsement process by which nodes associated with the skill-based attributes included in the block 462 are notified to provide authentication. In response, a current employer of the user 1 may submit an update to the user's skills as indicated by block 463, a licensing organization may submit information about the user's skills in 464, and a previous employer may submit information about the user in 465. Because the skill-based attributes are not a perfect match a conflict occurs. The example embodiments provide for temporary storage of data before being committed to a permanent storage. Therefore, conflicts within data blocks 462, 463, 464 and 465 can be resolved prior to the skill-based attributes being committed to a permanent blockchain in 466.

In particular, the user submits skill-based attributes including certificates A, B, and C, a work history of 7 years at a current job, and a version seven (7) of a license obtained. Before the data can be submitted to the main blockchain (permanent blockchain) it must be authenticated. In this example, the current employer of the user 1 provides work history information in block 463 authenticating the user has a work history of 7 years at the organization. Meanwhile, the certification organization submits authentication of a version 5 of the license as well as certifications A and C, but not B, in block 464. Meanwhile, a previous employer submits authentication of version 4 of the license, in block 465.

In this example, the work history of 7 years is fully authenticated by the current employer in block 463 and certificates A and C are fully authenticated by the certification authority in block 464. Therefore, block 466 stored on the main blockchain (permanent) may include this information. Meanwhile, conflicting accounts of the license version possessed by user 1 are provided. In this case, the smart contract may dictate which node's knowledge is given the greatest weight. Here, the certification organization controls the license. Accordingly, the license version (v5) is given weight over the user (v7) and the previous employer (v4) and therefore the version (v5) is authenticated. Furthermore, none of the nodes have authenticated the certification B, which is therefore left out of the permanent blockchain. Accordingly, when all the involving parties have shared their information in different blocks (or a period of time elapses), a smart contract decides which information will be considered as authentic. Please note smart contract will continuously try to resolve the conflict until consensus is reached, till this point, all the temporary blocks stay as part of temporary blockchain.

In this example, information in block 463 (10B), block 464 (11A) and block 465 (11B) may hold higher value than information added by the user in block 462 (10A). This information can be used to resolve conflicts between the user and the authoritative nodes. Meanwhile, when a conflict occurs between the authoritative nodes, a node with first-hand knowledge may control over a node with second-hand knowledge.

In some embodiments, the main data structure may be used to provide insight and information to approved entities (e.g., future employers, licensing agencies, boards, authoritative agencies, etc.) by allowing the approved entities to search for skill-based attributes of a user. For example, a front end interface may be displayed for inquiry with a common base to blockchain in backend. Data can be inquired through the front end directly or through a middleware maintained for querying the permanent blockchain. The middleware may or may not be shared among different peers. Middleware may provide different API/exposed methods to the front end. The API/exposed method can query the blockchain for read/write method of underlying blockchain. The query format may be in JSON format defining the data operation such as SELECT or INSERT or UPDATE along with related parameters in JSON format. Once the smart contract receives the request the response data may be provided in JSON format to the middleware/front end which will then be converted to user readable format. Meanwhile, a DELETE operation will be rejected by blockchain code.

Figure 5:
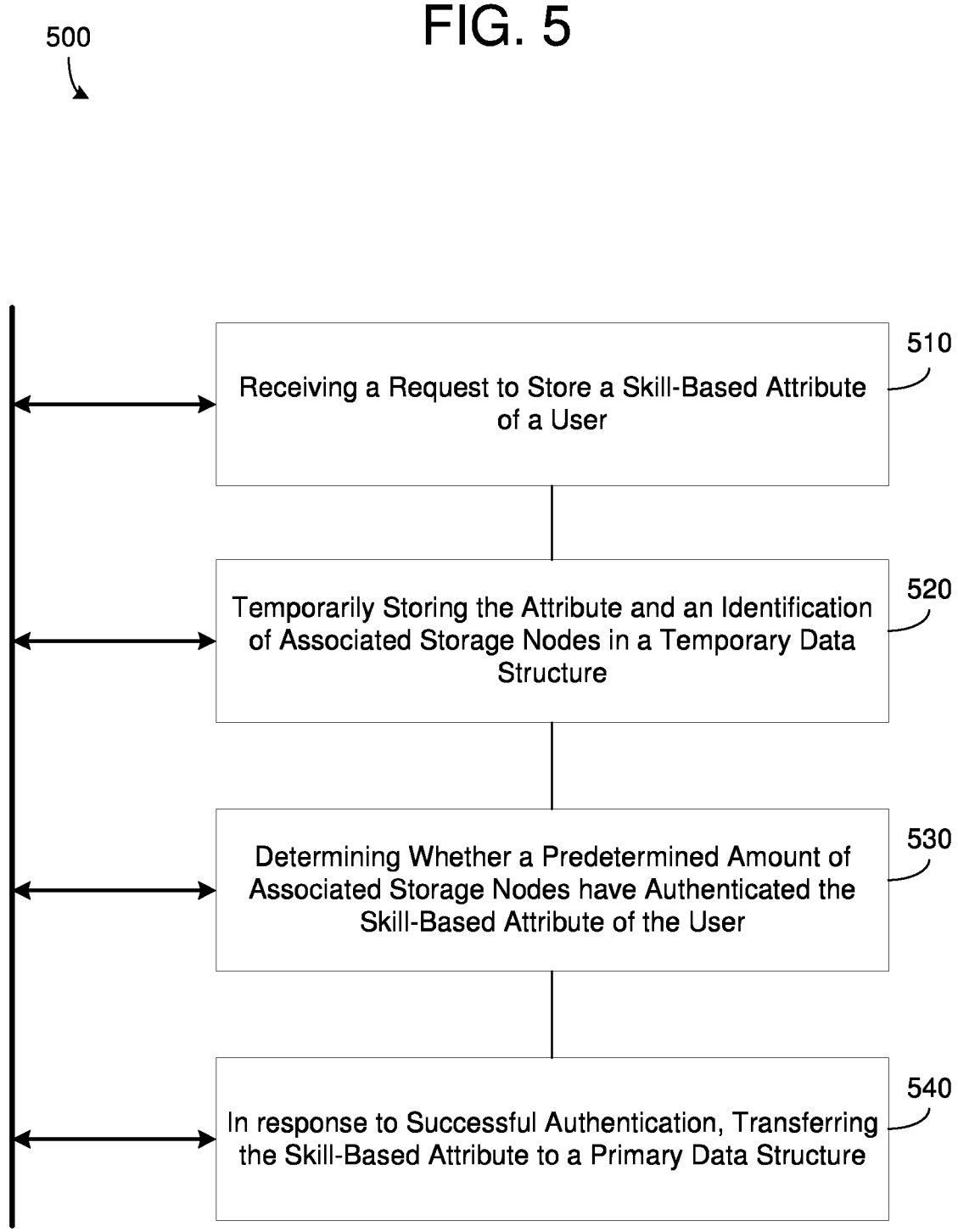
FIG. 5 is a diagram illustrating a method of storing an authenticated skill-based attribute of a user, according to example embodiments.

FIG. 5 illustrates a method 500 of storing an authenticated skill-based attribute of a user, according to example embodiments. For example, the method 500 may be stored by a storage node of a decentralized database. Referring to FIG. 5, in 510, the method may include receiving a request to store a skill-based attribute of a user at a database. For example, the skill-based attribute may include one or more of a work history attribute, a schooling attribute, and a certification attribute, which can be authenticated by one or more storage nodes. In some embodiments, the request may include a request from a new user who has not stored skills before at the database. As another example, the request may include a request to update to a previously stored skill-based attribute with a modification to the previously stored skill-based attribute.

In 520, the method may include temporarily storing the skill-based attribute and an identification of one or more storage nodes associated with the skill-based attribute in a temporary data structure of the database. For example, the temporary data structure may include a temporary blockchain or other type of decentralized database. In 530, the method may include determining whether a predetermined amount of the one or more storage nodes have authenticated the user as having the skill-based attribute, and in response successful authentication of the skill-based attribute by the predetermined amount of storage nodes, in 540 the method may include transferring the authenticated skill-based attribute from the temporary data structure to a primary data structure of the database.

In some embodiments, the primary data structure may be a permanent blockchain database which is distinct from the temporary blockchain database. The transferred skill-based attribute may be stored in a data block among a hash-linked chain of data blocks storing skill-based attribute information of a plurality of users. In some embodiments, the transferred skill-based attribute may be stored in a data section of the data block and a header section of the data block comprises a hash of block content of a previous data block among the hash-linked chain of data blocks. In response to two storage nodes providing different authentication information, previously stored consensus parameters dictate which of the two storage nodes prevails. In some embodiments, the skill-based attribute may include a plurality of skill-based attributes, and, in response to another skill-based attribute among the plurality not being authenticated, the non-authenticated skill-based attribute may be prevented from being transferred to the primary data structure. In other words, the non-authenticated skill can be held in the temporary data structure indefinitely.

Figure 6A:
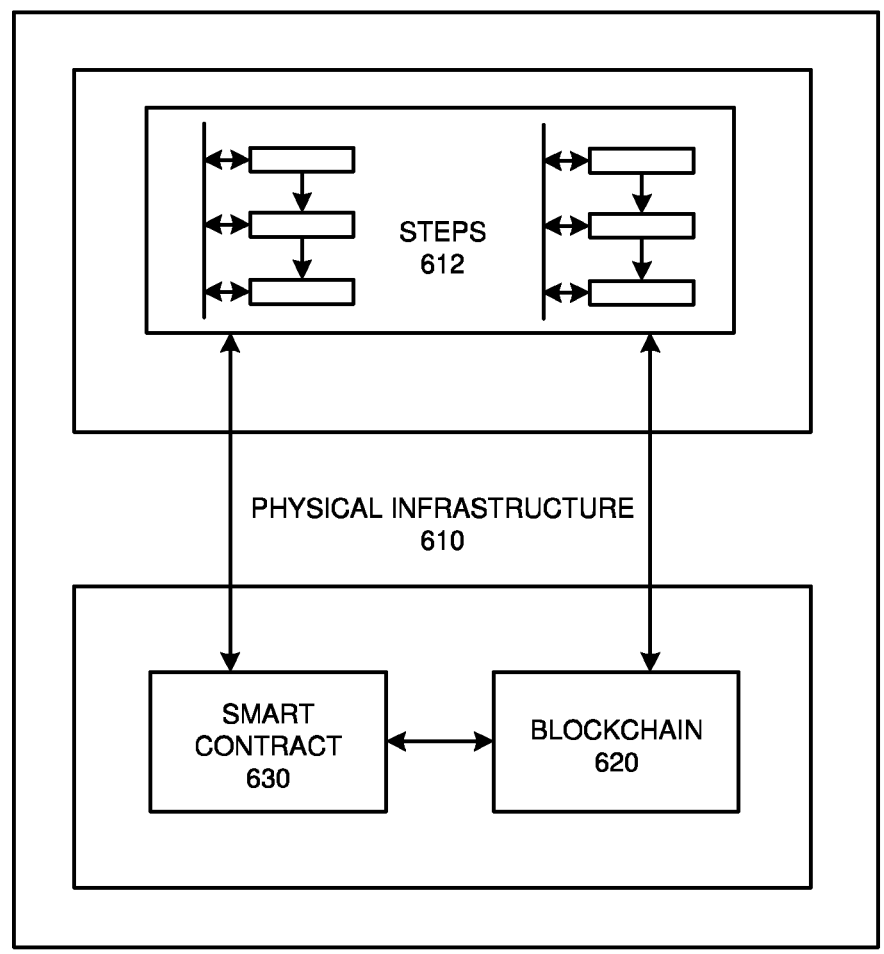
FIG. 6A is a diagram illustrating an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. For example, the steps may represent output or written information about skill-based attributes of the user which are to be or have been authenticated and that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
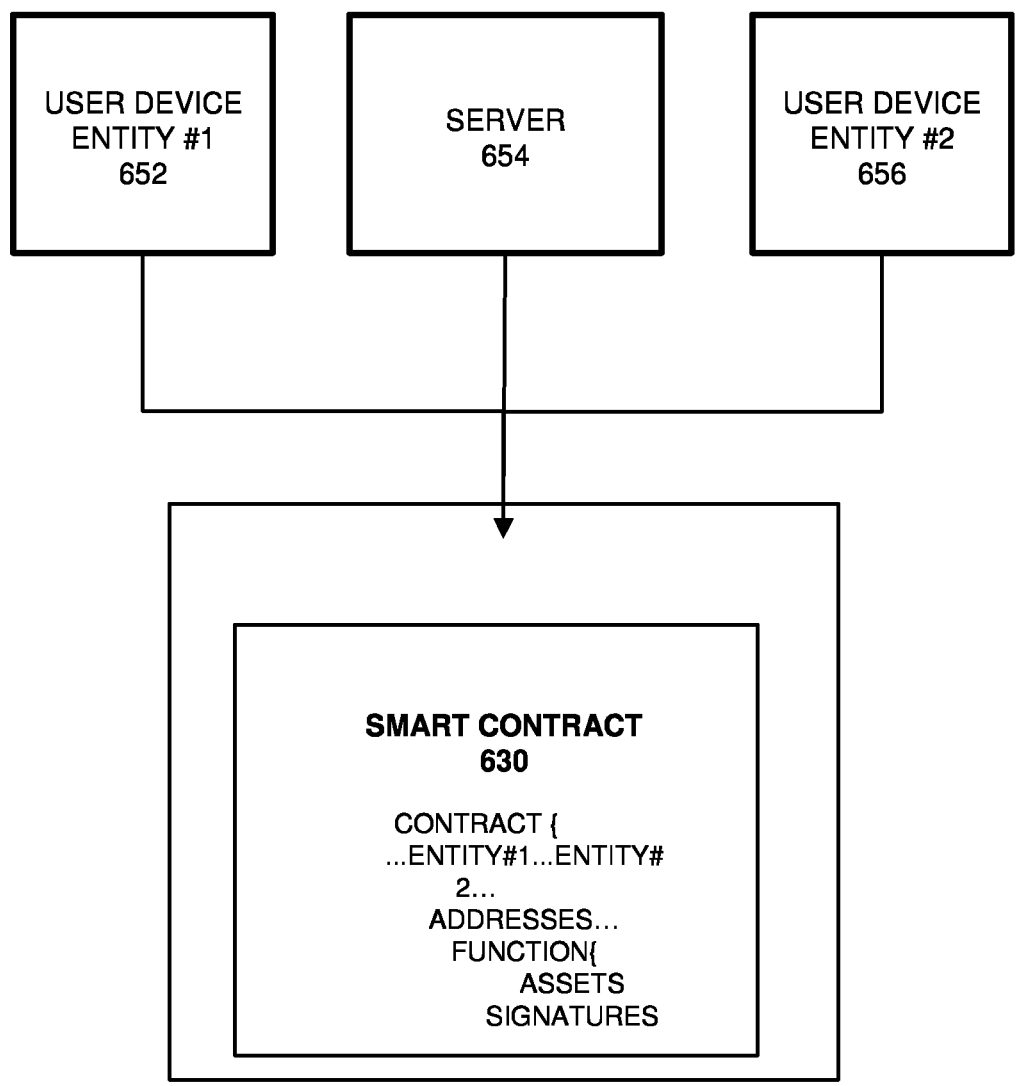
FIG. 6B is a diagram illustrating an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

According to various embodiments, the smart contract 640 may contain information about which peers are allowed to or must perform data alteration actions. The smart contract 640 may include logic for enrolling a new peer, node, or rule, and identification of which peers can subscribe for data read, an identification of which peers can validate/authenticate the skill-based data added to the blockchain before reaching consensus, rules to reach consensus in case of conflicts on data by two different peers, and the like. In some embodiments, the smart contract 640 may include metadata information to ensure what kind of data should be acceptable for a block, an identification of which peers will maintain what kind of data, metadata of final block which will define the height of blockchain, and the like. In case of conflicts, the smart contract 640 may identify which peer's information will be considered as having more weight than the other peer's information. The smart contract 640 may include logic for rejection of data in a block, an identification of which peer can alter the smart contract, a maximum block height (if any), and the like. In the examples herein, the smart contract 640 is deployed to the blockchain to ensure that the rules defined in the smart contract are enforced/followed.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
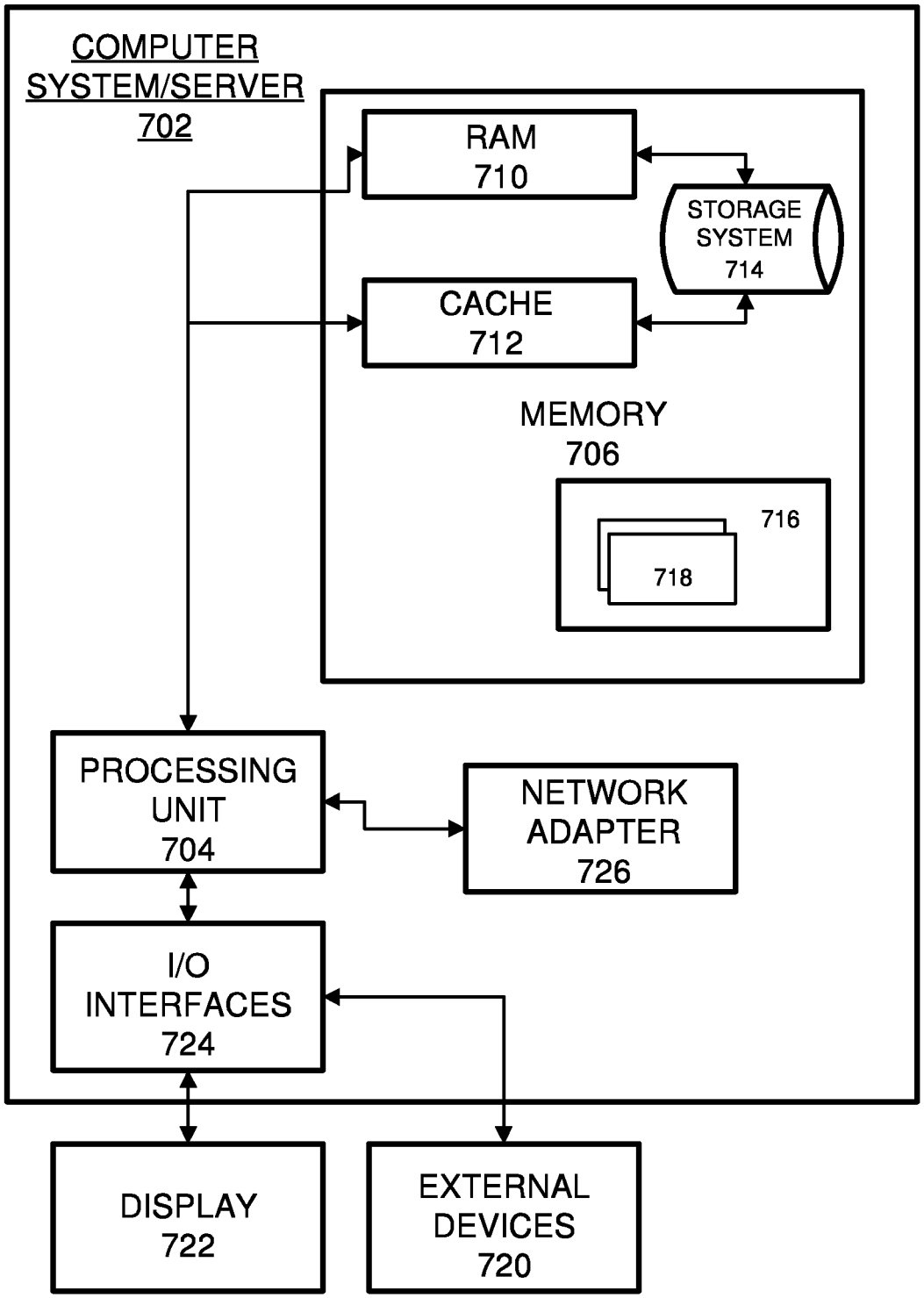
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to an example embodiment, the network interface 726 may receive a request to store a skill-based attribute of a user at a database. The processor 704 may temporarily store the skill-based attribute and an identification of one or more storage nodes associated with the skill-based attribute in a temporary data structure of the database (e.g., within memory 706, etc.), determine whether a predetermined amount of the one or more storage nodes have authenticated that the user as has the skill-based attribute, and, in response successful authentication of the skill-based attribute by the predetermined amount of storage nodes, transfer the authenticated skill-based attribute from the temporary data structure to a primary data structure of the database in memory 706.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a network interface configured to receive a plurality of instances of a block that has been endorsed by a plurality of blockchain peers, respectively, wherein the plurality of instances of the block comprise endorsed attributes of a user; and
a processor configured to
temporarily store the plurality of instances of the block in a temporary data structure,
determine that two instances of the block endorsed by two different blockchain peers corresponding to two different entities comprise endorsements of conflicting data of the user,
select an instance of the block from among the two conflicting instances of the block based on roles of the two entities with respect to the user; and
transfer the selected instance of the block from the temporary data structure to a blockchain ledger and delete an unselected instance of the block from among the two conflicting instances of the block from the temporary data structure.

2. The computing system of claim 1, wherein the attributes of the user comprise one or more of a training, an education, and a certification that is learned via one or more of work, school, and a certification program, and the processor is configured to determine whether the subset of blockchain peers have verified that the user previously acquired possession of the one or more of the training, the education, and the certification by the user.

3. The computing system of claim 1, wherein the plurality of instances of the block comprise a request to update a previously stored skill stored on the blockchain ledger with a modification to the previously stored skill.

4. The computing system of claim 1, wherein the temporary data structure comprises a temporary blockchain ledger which is distinct from the blockchain ledger.

5. The computing system of claim 1, wherein the processor is configured to select the instance of the block based on previously stored consensus parameters which dictate which of the two blockchain peers prevails.

6. The computing system of claim 1, wherein the data of the user comprises a plurality of skills, and, in response to another skill among the plurality skills not being verified by a blockchain peer, the non-verified skill is prevented from transfer to the blockchain ledger.

7. The computing system of claim 1, wherein the selected instance of the block is stored among a hash-linked chain of data blocks that store blockchain transactions with respective verified skills possessed by a plurality of users.

8. The computing system of claim 1, wherein the data about the user comprises a length of employment, and the processor is configured to determine whether a predetermined amount of blockchain peers have verified the length of employment by the user.

9. A method comprising:
receiving a plurality of instances of a block that has been endorsed by a plurality of blockchain peers, respectively, wherein the plurality of instances of the block comprise endorsed attributes of a user;
temporarily storing the plurality of instances of the block in a temporary data structure;
determining that two instances of the block endorsed by two different blockchain peers corresponding to two different entities comprise endorsements of conflicting data of the user;
selecting an instance of the block from among the two conflicting instances of the block based on roles of the two entities with respect to the user; and
transferring the selected instance of the block from the temporary data structure to a blockchain ledger and deleting an unselected instance of the block from among the two conflicting instances of the block from the temporary data structure.

10. The method of claim 9, wherein the attributes of the user comprise one or more of a training, an education, and a certification that is learned via one or more of work, school, and a certification program, wherein the determining comprises determining whether the subset of blockchain peers have verified that the user previously acquired possession of the one or more of the training, the education, and the certification by the user.

11. The method of claim 9, wherein the plurality of instances of the block comprise a request to update a previously stored skill stored on the blockchain ledger with a modification to the previously stored skill.

12. The method of claim 9, wherein the temporary data structure comprises a temporary blockchain ledger which is distinct from the blockchain ledger.

13. The method of claim 9, wherein the selecting comprises selecting the instance of the block based on previously stored consensus parameters which dictate which of the two blockchain peers prevails.

14. The method of claim 9, wherein the data of the user comprises a plurality of skills, and, in response to another skill among the plurality of skills not being verified by a blockchain peer, the non-verified skill is prevented from being transferred to the blockchain ledger.

15. The method of claim 9, wherein the selected instance of the block is stored among a hash-linked chain of data blocks storing blockchain transactions with respective verified skills of a plurality of users.

16. The method of claim 9, wherein the data about the user comprises a length of employment, and the determining comprises determining whether a predetermined amount of blockchain peers have verified the length of employment by the user.

17. A non-transitory computer readable medium comprising instructions, that when read by a processor, cause the processor to perform:
receiving a plurality of instances of a block that has been endorsed by a plurality of blockchain peers, respectively, wherein the plurality of instances of the block comprise endorsed attributes of a user;
temporarily storing the plurality of instances of the block in a temporary data structure;
determining that two instances of the block endorsed by two different blockchain peers corresponding to two different entities comprise endorsements of conflicting data of the user;
selecting an instance of the block from among the two conflicting instances of the block based on roles of the two entities with respect to the user; and transferring the selected instance of the block from the temporary data structure to a blockchain ledger and deleting an unselected instance of the block from among the two conflicting instances of the block from the temporary data structure.

18. The non-transitory computer readable medium of claim 17, wherein the attributes of the user comprise one or more of a training, an education, and a certification that is learned via one or more of work, school, and a certification program, wherein the determining comprises determining whether the subset of blockchain peers have verified that the user previously acquired possession of the one or more of the training, the education, and the certification by the user.

19. The non-transitory computer readable medium of claim 17, wherein the plurality of instances of the block comprise a request to update a previously stored skill stored on the blockchain ledger with a modification to the previously stored skill.

20. The non-transitory computer readable medium of claim 17, wherein the temporary data structure comprises a temporary blockchain ledger which is distinct from the blockchain ledger.

* * * * *